(12) United States Patent
Bossard et al.

(10) Patent No.: US 6,464,759 B1
(45) Date of Patent: Oct. 15, 2002

(54) HYDROGEN DIFFUSION CELL ASSEMBLY AND ITS METHOD OF MANUFACTURE

(76) Inventors: Peter R. Bossard, 33 Oswin Turn, Langhorne, PA (US) 19047; Paul D Bossard, 54 Steamwhistle Dr., Ivyland, PA (US) 18974

( * ) Notice: Subject to any disclaimer, the term of this patent is extended or adjusted under 35 U.S.C. 154(b) by 12 days.

(21) Appl. No.: 09/702,636

(22) Filed: Nov. 1, 2000

(51) Int. Cl.[7] .............................................. B01D 53/22
(52) U.S. Cl. ..................................... 96/7; 95/56; 96/10
(58) Field of Search .............................. 95/55, 56; 96/4, 96/7–11

(56) References Cited

U.S. PATENT DOCUMENTS

| | | | | |
|---|---|---|---|---|
| 2,911,057 A | * | 11/1959 | Green et al. | 96/8 |
| 3,274,754 A | * | 9/1966 | Rubin | 96/8 |
| 3,279,154 A | * | 10/1966 | Emerson et al. | 96/8 |
| 3,336,730 A | * | 8/1967 | McBride et al. | 95/56 |
| 5,888,273 A | * | 3/1999 | Buxbaum | 95/56 |
| 6,168,650 B1 | * | 1/2001 | Buxbaum | 95/55 |

* cited by examiner

*Primary Examiner*—Robert H. Spitzer
(74) *Attorney, Agent, or Firm*—LaMorte & Associates, P.C.

(57) ABSTRACT

A hydrogen diffusion cell that is used to purify contaminated hydrogen gas. The hydrogen diffusion cell has a supply tube that supplies contaminated hydrogen gas into a confined area and a drain tube that removes contaminated hydrogen gas from the confined area. Hydrogen permeable coils are disposed between the supply tube and the drain tube. The coils include at least one small diameter coil. Concentrically surrounding the small diameter coil is at least one larger diameter coil. All coils are mounted in such a manner so that they maintain a constant radius of curvature along their entire lengths.

19 Claims, 2 Drawing Sheets

HYDROGEN DIFFUSION CELL ASSEMBLY AND ITS METHOD OF MANUFACTURE

RELATED APPLICATIONS

This application is related to co-pending patent application Ser. No. 09/702,637, entitled METHOD AND APPARATUS FOR WINDING THIN WALLED TUBING.

REFERENCE TO DOCUMENT DISCLOSURE

The matter of this application corresponds to the matter contained in Disclosure Document 454147 filed Apr. 1, 1999, wherein this application assumes the priority date of that document.

BACKGROUND OF THE INVENTION

1. Field of the Invention

In general, the present invention relates to hydrogen diffusion cells. More particularly, the present invention relates to hydrogen diffusion cells that contain wound coils of palladium tubing.

2. Description of the Prior Art

In industry, there are many known techniques for separating hydrogen from more complex molecules in order to produce a supply of hydrogen gas. One such technique is electrolysis, wherein hydrogen gas is obtained from water. Regardless of how hydrogen gas is obtained, the collected hydrogen gas is typically contaminated with secondary gases, such as water vapor, hydrocarbons and the like. The type of contaminants in the collected hydrogen gas are dependent upon the technique used to generate the hydrogen gas.

Although contaminated hydrogen gas is useful for certain applications, many other applications require the use of pure hydrogen. As such, the contaminated hydrogen gas must be purified. One technique used to purify hydrogen is to pass the hydrogen through a hydrogen diffusion cell. A typical hydrogen diffusion cell contains a single coil of palladium tubing. The palladium tubing is heated and the contaminated hydrogen gas is directed through the palladium tubing. When heated, the palladium tubing is permeable to hydrogen gas but not to the contaminants that may be mixed with the hydrogen gas. As such, nearly pure hydrogen passes through the palladium tubing and is collected for use.

Prior art hydrogen diffusion cells that use a coil of palladium tubing have many problems. One of the major problems is that of reliability. As a coil of palladium tubing is repeatedly heated and cooled, it expands and contracts. The longer the wound tube is, the more the tube expands and contracts. As the palladium tubing expands and contacts, cracks occur in the tubing. Cracks are particularly prevalent at the ends of the tubing where the palladium tubing is welded to common piping. Once a crack occurs in the palladium tubing or the welded supports of the tubing, the hydrogen diffusion cell ceases to function properly.

One solution that has been attempted to increase the reliability of hydrogen diffusion cells is to decrease the length of the palladium tubing and/or the number of windings in the coil of palladium tubing. These techniques reduce the degree of expansion and contraction experienced by the palladium tubing but also greatly decrease the surface area of the palladium tubing and thus the output and efficiency of the hydrogen diffusion cell.

A need therefore exists for a new hydrogen diffusion cell that has increased reliability yet does not have decreased flow efficiency. This need is met by the present invention as it is described and claimed below.

SUMMARY OF THE INVENTION

The present invention is a hydrogen diffusion cell that is used to purify contaminated hydrogen gas. The hydrogen diffusion cell has a supply tube that supplies contaminated hydrogen gas and a drain tube that removes contaminated hydrogen gas. Hydrogen permeable coils are disposed between the supply tube and the drain tube. The coils include at least one small diameter coil. Concentrically surrounding the small diameter coil is at least one larger diameter coil. All coils are mounted in such a manner that they maintain a constant radius of curvature along their entire lengths.

As contaminated hydrogen passes from the supply tube to the drain tube through the various coils, purified hydrogen permeates through the material of the coils and is collected from a confined space that surrounds the coils.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
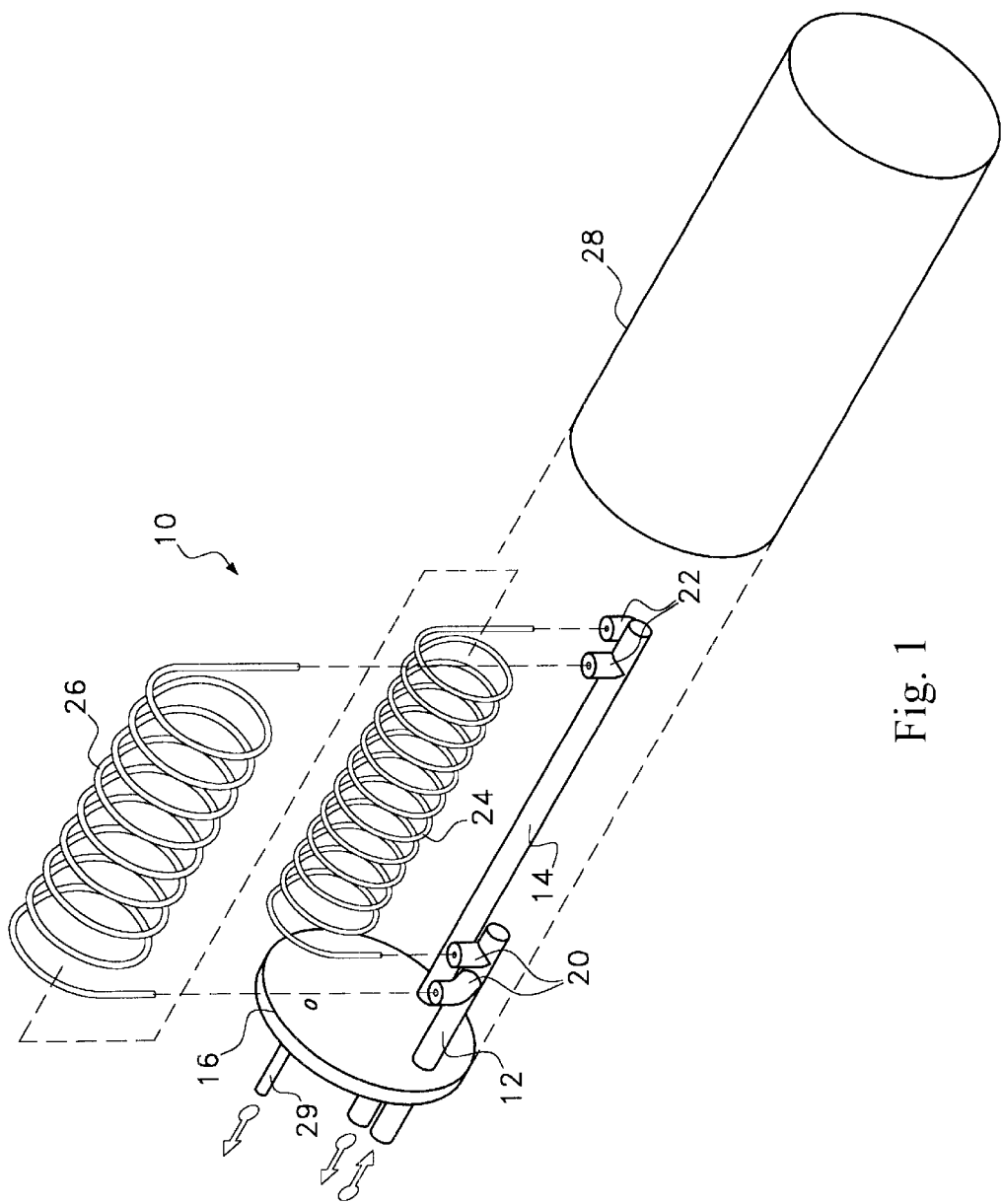
FIG. 1 is an exploded perspective view of a hydrogen diffusion cell in accordance with the present invention.

Referring to FIG. 1, a first exemplary embodiment of a hydrogen diffusion cell 10 is shown in accordance with the present invention. The diffusion cell 10 contains a supply tube 12 and a drain tube 14. The supply tube 12 and the drain tube 14 are both made of stainless steel or another inert high strength alloy. Both the supply tube 12 and the drain tube 14 pass through an end cap plate 16. The supply tube 12 and the drain tube 14 are welded to the end cap plate 16 at the points where the supply tube 12 and the drain tube 14 pass through the end cap plate 16. To prevent stresses caused by expansion and contraction, the end cap plate 16 is preferably made of the same material as is the supply tube 12 and the drain tube 14.

On the supply tube 12 is located a clustered set of brazing flanges 20. Each brazing flange 20 is a short segment of tubing that is welded to the supply tube 12. The short segment of tubing is made of the same material as is the supply tube 12. Within each clustered set of brazing flanges 20, each brazing flange 20 is a different distance from the end cap plate 16. Furthermore, each brazing flange 20 in the clustered set radially extends from the supply tube 12 at an angle different from that of any of the other brazing flanges 20 in that same clustered set.

In the embodiment shown in FIG. 1, there is only one clustered set of brazing flanges 20 on the supply tube 12 and that clustered set contains two brazing flanges 20. Such an embodiment is merely exemplary. As will later be explained, multiple clustered sets of brazing flanges 20 can be present on the supply tube 12 and any plurality of brazing flanges 20 can be contained within each clustered set.

The drain tube 14 also contains clustered sets of brazing flanges 22. The brazing flanges 22 are of the same construction as those on the supply tube 12. The number of clustered sets of brazing flanges 22 on the drain tube 14 correspond in number to the number of clustered sets of brazing flanges 20 present on the supply tube 12. Similarly, the number of brazing flanges 22 contained within each clustered set on the drain tube 14 correspond in number to the number of brazing flanges 20 in each clustered set on the supply tube 12.

A plurality of concentric coils 24, 26 are provided. The concentric coils 24, 26 are made from palladium or a palladium alloy. The process used to make the coils is the subject of co-pending U.S. patent application Ser. No. 09/702,637, entitled METHOD AND APPARATUS FOR WINDING THIN WALLED TUBING, the disclosure of which is incorporated into this specification by reference.

The number of brazing flanges 20, 22 in each clustered set corresponds in number to the number of coils 24, 26. One end of each coil 24, 26 extends into the brazing flanges 20 on the supply tube 12. The opposite end of each coil 24, 26 extends into a brazing flange 22 on the drain tube 14. The concentric coils 24, 26 have different diameters so that they can fit one inside another. Furthermore, each coil has a slightly different length so that the ends of the coils align properly with the different brazing flanges 20, 22 on the supply tube 12 and the drain tube 14, respectively.

In the embodiment of FIG. 1, there are two coils 24, 26. As such, there are two brazing flanges 20 on the supply tube 12 and two brazing flanges 22 on the drain tube 14. It will be understood that more than two concentric coils can be used. In any case, the number of supply brazing flanges 20 and drain brazing flanges 22 would match the number of coils used.

The coils 24, 26 have a nearly constant radius of curvature from one end to the other. As such, the coils 24, 26 do no contain any natural stress concentration points that may prematurely crack as the coils 24, 26 expand and contract. To further increase the reliability of the hydrogen diffusion cell 10, the brazing flanges 20 on the supply tube 12 and the brazing flanges 22 on the drain tube 14 are treated. The brazing flanges 20, 22 are chemically polished prior to brazing. Such a preparation procedure produces high quality brazing connections that are much less likely to fail than brazing connections with untreated brazing flanges.

Once the coils 24, 26 are attached to the supply tube 12 and the drain tube 14, the coils 24, 26 are covered with a cylindrical casing 28. The cylindrical casing 28 is welded closed at the end cap plate 16, thereby completing the assembly. An output tube 29 communicates with the interior of the cylindrical casing 28. The output tube 29 can be located either in the end cap plate 16, as is shown, or at any point in the cylindrical casing 28.

To utilize the hydrogen diffusion cell 10, the cell 10 is heated. Once at the proper temperature, contaminated hydrogen gas is fed into the supply tube 12. The contaminated hydrogen gas fills the coils 24, 26. Purified hydrogen gas permeates through the coils 24, 26 and is collected in the cylindrical casing 28. The purified hydrogen gas is collected through the output tube 29. The remainder of the contaminated hydrogen gas is drained through the drain tube 14 for reprocessing.

Figure 2:
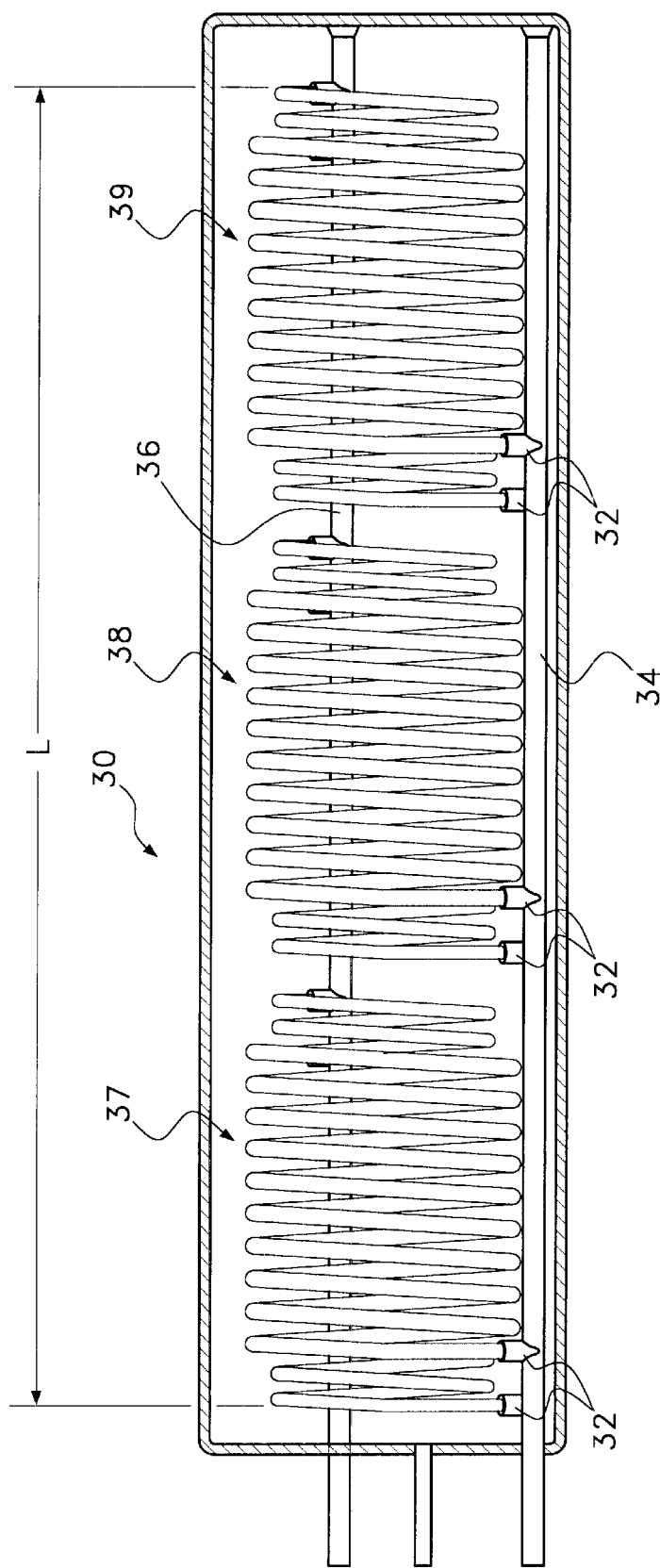
FIG. 2 is a perspective view of an alternate embodiment of a hydrogen diffusion cell in accordance with the present invention.

Referring to FIG. 2, an alternate embodiment of a hydrogen diffusion cell 30 is shown. In this embodiment, there are multiple clusters of brazing flanges 32 on both the supply tube 34 and the drain tube 36. For each cluster of brazing flanges, there is a set of concentric coils. In the shown embodiment, there are three clusters of supply brazing flanges 32 and three clusters of drain blazing flanges (not shown). Accordingly, there are supplied three separate sets of concentric tubes 37, 38, 39. Each set of concentric tubes 37, 38, 39 consists of multiple tubes of different diameters. The ends of the tubes are brazed to the corresponding clusters of supply brazing flanges 32 and drain brazing flanges.

The coils within the hydrogen diffusion cell have a combined length L, however, no one coil in the hydrogen diffusion cell 30 extends across that length. Since shorter coils are used in series, the amount of expansion and contraction experienced by any one coil is minimized. However, the effective combined length of the various coils can be made to any length.

The use of three separate sets of coils 37, 38, 39 in the embodiment of FIG. 2 is merely exemplary and it will be understood that any number of sets can be used. Furthermore, each set of coils can contain any number of concentric coils depending upon the design requirements of the hydrogen diffusion cell 30.

There are many variations to the present invention device that can made. For instance, the length and diameter of the coils, supply tube and drain tube can be changed. The number of sets of concentric coils can be changed and the number of concentric coils in each set can be changed. It will therefore be understood that a person skilled in the art can make numerous alterations and modifications to the shown embodiments utilizing functionally equivalent components to those shown and described. All such modifications are intended to be included within the scope of the present invention as defined by the appended claims.

What is claimed is:

1. A hydrogen diffusion cell device, comprising:
a casing that defines an internal space;
a supply tube having a section that extends a predetermined length into said casing;
a drain tube having a section that extends a predetermined length into said casing;
a plurality of coils that include an inner coil and at least one outer coil that concentrically surrounds at least a segment of said inner coil, wherein each of said coils has a first end coupled to said section of said supply tube that extends into said casing and a second end coupled to said section of said drain tube that extends into said casing;
wherein said casing surrounds said plurality of coils and collects any gas that permeates out of said coils between said supply tube and said drain tube.

2. The device according to claim 1, wherein said plurality of coils are hydrogen permeable.

3. The device according to claim 1, further including a first plurality of brazing flanges extending from said section of said supply tube that extends into said casing, wherein said first end of each of said coils is received by one of said first plurality of brazing flanges.

4. The device according to claim 3, further including a second plurality of brazing flanges extending from said section of said drain tube that extends into said casing, wherein said second end of each of said coils is received by one of said second plurality of brazing flanges.

5. The device according to claim 4, wherein said second plurality of brazing flanges are chemically polished.

6. The device according to claim 3, wherein said first plurality of brazing flanges are chemically polished.

7. A hydrogen diffusion cell device, comprising:
a casing that defines an internal space;
a supply tube having a section that extends a predetermined length into said casing;

a drain tube having a section that extends a predetermined length into said casing;

a first plurality of coils, each of said first plurality of coils having a first end coupled to said section of said supply tube that extends into said casing, and a second end coupled to said section of said drain tube that extends into said casing, wherein each of said first plurality of coils are concentrically aligned and do not overlap;

wherein said casing surrounds said first plurality of coils and collects any gas that permeates out of said first plurality of coils between said supply tube and said drain tube.

8. The device according to claim 7, further including a second plurality of coils, said second plurality of coils having a first end coupled to said section of said supply tube that extends into said casing and a second end coupled to said section of said drain tube that extends into said casing.

9. The device according to claim 8, wherein said second plurality of coils includes at least one separate coil that concentrically surrounds each of said first plurality of coils.

10. The device according to claim 9, wherein both said first plurality of coils and said second plurality of coils are hydrogen permeable.

11. The device according to claim 9, further including a first plurality of brazing flanges extending from said supply tube within said casing, wherein said first end of each of said first plurality of coils and said second plurality of coils are received by said first plurality of brazing flanges.

12. The device according to claim 11, wherein said first plurality of brazing flanges are chemically polished.

13. The device according to claim 9, further including a second plurality of brazing flanges extending from said drain tube within said casing, wherein said second end of each of said first plurality of coils and said second plurality of coils are received by one of said second plurality of brazing flanges.

14. The device according to claim 13, wherein said second plurality of brazing flanges are chemically polished.

15. The device according to claim 9, wherein each of said second plurality of coils has a constant radius of curvature between said first end and said second end.

16. The device according to claim 7, wherein each of said first plurality of coils has a constant radius of curvature between said first end and said second end.

17. A method of manufacturing a hydrogen diffusion cell, comprising the steps of:

providing a casing, wherein a section of a supply tube extends a first predetermined distance into said casing and a section of a drain tube extends a second predetermined length into said casing;

providing at first coil having a first end and a second end;

providing a second coil having a first end and a second end;

coupling both said first end of said first coil and said first end of said second coil to said section of said supply tube that extends into said casing;

coupling both said second end of said first coil and said second end of said second coil to said section of said supply tube that extends into said casing, wherein said first coil is concentrically positioned within said second coil.

18. The method according to claim 17, further including the step of providing at least one first subsequent coil and coupling said at least one first subsequent coil to said supply tube and said drain tube within said casing so that said at least one first subsequent coil is concentrically aligned with said first coil but does not overlap said first coil.

19. The method according to claim 18, further including the step of providing at least one second subsequent coil and coupling said at least one second subsequent coil to said supply tube and said drain tube within said casing so that each said second subsequent coil surrounds each said first subsequent coil.

\* \* \* \* \*